US012626159B2

(12) United States Patent
Fang et al.

(10) Patent No.: US 12,626,159 B2
(45) Date of Patent: May 12, 2026

(54) MUSIC RECOMMENDATION METHOD AND APPARATUS

(71) Applicant: HUAWEI TECHNOLOGIES CO., LTD., Shenzhen (CN)

(72) Inventors: Shu Fang, Beijing (CN); Libin Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 597 days.

(21) Appl. No.: 18/175,097

(22) Filed: Feb. 27, 2023

(65) Prior Publication Data

US 2023/0206093 A1      Jun. 29, 2023

Related U.S. Application Data

(63) Continuation of application No. PCT/CN2020/112414, filed on Aug. 31, 2020.

(51) Int. Cl.
*G06N 5/04*          (2023.01)
*G06F 3/01*          (2006.01)
          (Continued)

(52) U.S. Cl.
CPC ............. *G06N 5/04* (2013.01); *G06F 16/635* (2019.01); *G06V 20/50* (2022.01); *G06V 40/20* (2022.01); *G06F 3/012* (2013.01); *G06F 3/165* (2013.01)

(58) Field of Classification Search
CPC .......... G06N 5/04; G06V 20/50; G06V 40/20; G06F 3/012; G06F 3/165; G06F 16/436; G06F 16/635
See application file for complete search history.

(56) References Cited

U.S. PATENT DOCUMENTS 12,099,558  B2 *   9/2024   Zheng ...................... G06N 3/09
2015/0271571  A1    9/2015   Laksono et al.
                    (Continued)

FOREIGN PATENT DOCUMENTS

CN       105589506  A      5/2016
CN       109151176  A      1/2019
                    (Continued)

OTHER PUBLICATIONS

Jacob, S., Ishimaru, S., Bukhari, S. S., & Dengel, A. (Jun. 2018). Gaze-based interest detection on newspaper articles. In Proceedings of the 7th Workshop on Pervasive Eye Tracking and Mobile Eye-Based Interaction (pp. 1-7). (Year: 2018).*

*Primary Examiner* — James T Tsai
(74) *Attorney, Agent, or Firm* — WOMBLE BOND DICKINSON (US) LLP

(57) ABSTRACT

A music recommendation method and apparatus are provided, to determine an attention mode of a user in a complex environment by using viewpoint information of the user, thereby more precisely implementing music matching. According to a first aspect, a music recommendation method is provided. The method includes: receiving visual data of a user (S501); obtaining at least one attention unit and attention duration of the at least one attention unit based on the visual data (S502); determining an attention mode of the user based on the attention duration of the at least one attention unit (S503); and determining recommended music information based on the attention mode (S504).

17 Claims, 5 Drawing Sheets

First wearable device

Viewpoint and picture data

Control signal

Mobile terminal device

Control signal

Second wearable device

(51) Int. Cl.
| | |
|---|---|
| *G06F 3/16* | (2006.01) |
| *G06F 16/635* | (2019.01) |
| *G06V 20/50* | (2022.01) |
| *G06V 40/20* | (2022.01) |

(56)                    References Cited

U.S. PATENT DOCUMENTS

| | | | |
|---|---|---|---|
| 2016/0109941 A1* | 4/2016 | Govindarajeswaran | .................... G06F 16/54 345/156 |
| 2019/0102706 A1* | 4/2019 | Frank | ...................... G06N 5/046 |
| 2019/0221191 A1* | 7/2019 | Chhipa | .................. G09G 3/002 |
| 2020/0327378 A1* | 10/2020 | Smith | .................... G06N 5/048 |
| 2021/0065217 A1* | 3/2021 | Glaser | ................ G06Q 10/0637 |

FOREIGN PATENT DOCUMENTS

| | | | |
|---|---|---|---|
| CN | 111241385 A | 6/2020 |
| CN | 111400605 A | 7/2020 |
| JP | 5541529 B2 | 7/2014 |

* cited by examiner

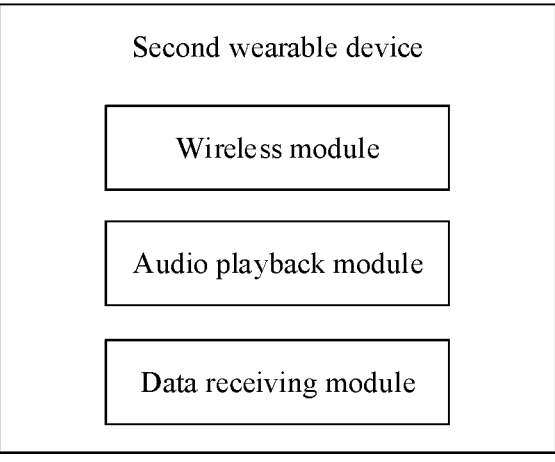

Second wearable device

Wireless module

Audio playback module

Data receiving module

FIG. 4

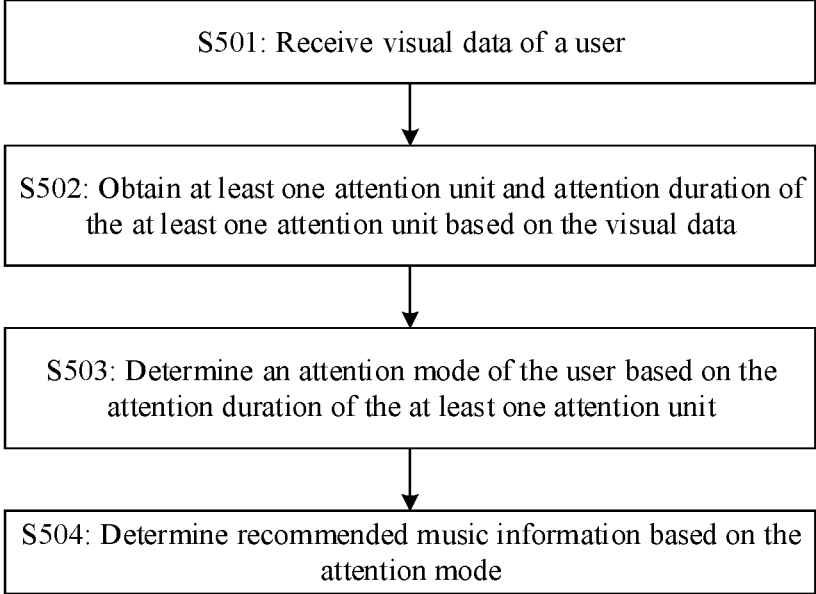

S501: Receive visual data of a user

S502: Obtain at least one attention unit and attention duration of the at least one attention unit based on the visual data S503: Determine an attention mode of the user based on the attention duration of the at least one attention unit S504: Determine recommended music information based on the attention mode

FIG. 5

MUSIC RECOMMENDATION METHOD AND APPARATUS

CROSS-REFERENCE TO RELATED APPLICATIONS

This disclosure is a continuation of International Application No. PCT/CN2020/112414, filed on Aug. 31, 2020. The disclosures of the aforementioned application are hereby incorporated by reference in entirety.

TECHNICAL FIELD

This disclosure relates to the field of artificial intelligence, and more specifically, to a music recommendation method and apparatus.

BACKGROUND

A personalized music recommendation technology can improve music experience of a user. A conventional method is that music recommendation is implemented by using a data mining technology based on historical music playback information of a user. In this method, current state information of the user cannot be considered. Currently, in some methods, current state information of a user may be collected by using different sensors. For example, related music recommendation is implemented by sensing environmental information including information such as a position, weather, a time, a season, ambient sound, and an environment picture; or related music recommendation is implemented by measuring the current state information of the user, for example, analyzing a current psychological state of the user by collecting a brain wave, collecting a picture seen by the user, or obtaining a heart rate of the user.

In a current method, music recommendation is performed based on an image that is seen by a user and that is collected through shooting. This relates to a music-image matching process. In an actual scenario, an environment may include many scenes. If music recommendation is implemented based on only an entire image, a music matching degree is reduced.

SUMMARY

This disclosure provides a music recommendation method and apparatus, to determine an attention mode of a user in a complex environment by using viewpoint information of the user, thereby more precisely implementing music matching.

According to a first aspect, a music recommendation method is provided. The method includes: receiving visual data of a user; obtaining at least one attention unit and attention duration of the at least one attention unit based on the visual data; determining an attention mode of the user based on the attention duration of the at least one attention unit; and determining recommended music information based on the attention mode.

In the music recommendation method in this embodiment of this disclosure, the attention mode of the user is determined based on visual information of the user, to more precisely determine attention content of the user, so that more suitable music is recommended, and the recommended music is in line with a thing that the user is really interested in and is in line with a real behavior state of the user, thereby improving user experience.

With reference to the first aspect, in a possible implementation of the first aspect, the visual data includes viewpoint information of the user and picture information viewed by the user, and the viewpoint information includes a position of a viewpoint and attention duration of the viewpoint.

With reference to the first aspect, in a possible implementation of the first aspect, the obtaining at least one attention unit and attention duration of the at least one attention unit based on the visual data includes: obtaining the at least one attention unit based on the picture information; and obtaining a sum of the attention duration of the viewpoint in the at least one attention unit, to use the sum as the attention duration of the at least one attention unit.

In the music recommendation method in this embodiment of this disclosure, an initial attention unit is determined based on the obtained picture information, and duration of each attention unit is determined based on the viewpoint information of the user. Compared with the conventional technology in which music recommendation is implemented based on only an entire picture viewed by a user, the viewpoint information may precisely indicate the attention content that the user is interested in, so that the recommended music can be more in line with a requirement of the user.

With reference to the first aspect, in a possible implementation of the first aspect, the obtaining at least one attention unit and attention duration of the at least one attention unit based on the visual data further includes: determining similarity between a first attention unit and a second attention unit in the at least one attention unit, where the first attention unit and the second attention unit are attention units at different moments; and if the similarity is greater than or equal to a first threshold, attention duration of the second attention unit is equal to a sum of attention duration of the first attention unit and the attention duration of the second attention unit.

In the music recommendation method in this embodiment of this disclosure, the first attention unit and the second attention unit may be attention units in image frames at different moments within a preset time period, or may be respectively an attention unit in a historical library and a newly obtained attention unit.

With reference to the first aspect, in a possible implementation of the first aspect, the determining an attention mode of the user based on the attention duration of the at least one attention unit includes: if a standard deviation of the attention duration of the at least one attention unit is greater than or equal to a second threshold, determining that the attention mode of the user is staring; or if a standard deviation of the attention duration of the at least one attention unit is less than a second threshold, determining that the attention mode of the user is scanning.

With reference to the first aspect, in a possible implementation of the first aspect, the determining music information based on the attention mode includes: if the attention mode is scanning, determining the music information based on the picture information; or if the attention mode is staring, determining the music information based on an attention unit with highest attention in the attention units.

In the music recommendation method in this embodiment of this disclosure, after the attention mode of the user is determined, the music information suitable for recommendation to the user within the preset time period may be determined based on the attention mode of the user within the preset time period. When the attention mode of the user is scanning, it is considered that the user mainly perceives an environment within the preset time period, and music recommendation may be implemented based on the picture information (the environment). When the attention mode of the user is staring, it is considered that the user mainly perceives a thing of interest within the preset time period, and music recommendation may be implemented based on the attention unit with the highest attention (the thing of interest).

With reference to the first aspect, in a possible implementation of the first aspect, the determining music information based on the attention mode further includes: determining a behavior state of the user at each moment within a first time period based on the attention mode; determining a behavior state of the user within the first time period based on the state at each moment; and determining the music information based on the behavior state within the first time period.

In the music recommendation method in this embodiment of this disclosure, after the attention content is determined based on the attention mode of the user within a preset time period, the music information may not be determined first. Instead, the behavior state of the user within the preset time period is determined, and then an overall behavior state of the user within the first time period is determined based on behavior states of a plurality of preset time periods. Therefore, an actual behavior state of the user can be more precisely determined, music recommendation is implemented based on the overall behavior state, and the recommended music is more in line with the actual behavior state of the user.

According to a second aspect, a music recommendation apparatus is provided. The apparatus includes a transceiver module, configured to receive visual data of a user; and a determining module, configured to obtain at least one attention unit and attention duration of the at least one attention unit based on the visual data, where the determining module is further configured to determine an attention mode of the user based on the attention duration of the at least one attention unit, and the determining module is further configured to determine recommended music information based on the attention mode.

This embodiment of this disclosure provides the music recommendation apparatus to implement the music recommendation method in the first aspect.

With reference to the second aspect, in a possible implementation of the second aspect, the visual data includes viewpoint information of the user and picture information viewed by the user, and the viewpoint information includes a position of a viewpoint and attention duration of the viewpoint.

With reference to the second aspect, in a possible implementation of the second aspect, that the determining module obtains at least one attention unit and attention duration of the at least one attention unit based on the visual data includes: obtaining the at least one attention unit based on the picture information; and obtaining a sum of the attention duration of the viewpoint in the at least one attention unit, to use the sum as the attention duration of the at least one attention unit.

With reference to the second aspect, in a possible implementation of the second aspect, that the determining module obtains at least one attention unit and attention duration of the at least one attention unit based on the visual data further includes: determining similarity between a first attention unit and a second attention unit in the at least one attention unit, where the first attention unit and the second attention unit are attention units at different moments; and if the similarity is greater than or equal to a first threshold, attention duration of the second attention unit is equal to a sum of attention duration of the first attention unit and the attention duration of the second attention unit.

With reference to the second aspect, in a possible implementation of the second aspect, that the determining module determines an attention mode of the user based on the attention duration of the at least one attention unit includes: if a standard deviation of the attention duration of the at least one attention unit is greater than or equal to a second threshold, determining that the attention mode of the user is staring; or if a standard deviation of the attention duration of the at least one attention unit is less than a second threshold, determining that the attention mode of the user is scanning.

With reference to the second aspect, in a possible implementation of the second aspect, that the determining module is configured to determine music information based on the attention mode includes: if the attention mode is scanning, determining the music information based on the picture information; or if the attention mode is staring, determining the music information based on an attention unit with highest attention in the attention units.

With reference to the second aspect, in a possible implementation of the second aspect, that the determining module determines music information based on the attention mode further includes: determining a behavior state of the user at each moment within a first time period based on the attention mode; determining a behavior state of the user within the first time period based on the state at each moment; and determining the music information based on the behavior state within the first time period.

According to a third aspect, a computer-readable storage medium is provided. The computer-readable storage medium stores program instructions, and when the program instructions are run by a processor, the method in the first aspect and any implementation of the first aspect is implemented.

According to a fourth aspect, a computer program product is provided. The computer program product includes computer program code, and when the computer program code is run on a computer, the method in the first aspect and any implementation of the first aspect is implemented.

According to a fifth aspect, a music recommendation system is provided. The system includes a data collection device and a terminal device, where the terminal device includes a processor and a memory, the memory stores one or more programs, and the one or more computer programs include instructions; the data collection device is configured to collect visual data of a user; and when the instructions are executed by the one or more processors, the terminal device is enabled to perform the method in the first aspect and any implementation of the first aspect.

BRIEF DESCRIPTION OF DRAWINGS

FIG. 4 is a block diagram of a second wearable device in a system architecture applied to a music recommendation method according to an embodiment of this disclosure;

FIG. 5 is a flowchart of a music recommendation method according to an embodiment of this disclosure;

DESCRIPTION OF EMBODIMENTS

Figure 1:
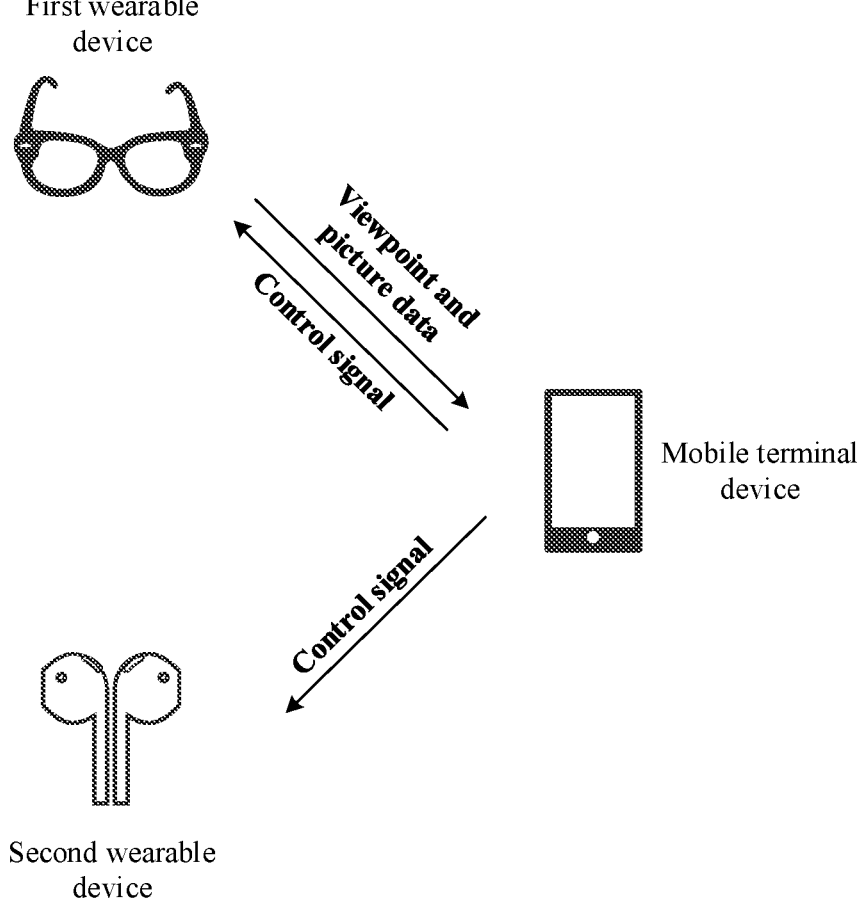
FIG. 1 illustrates a system architecture applied to a music recommendation method according to an embodiment of this disclosure.

Terms used in the following embodiments are merely intended to describe particular embodiments, but are not intended to limit this disclosure. Terms "one", "a", "the", "the foregoing", "this", and "the one" of singular forms used in this specification and the appended claims of this disclosure are also intended to include plural forms like "one or more", unless otherwise specified in the context clearly. It should also be understood that, in the following embodiments of this disclosure, "at least one" and "one or more" refer to one, two, or more than two. Term "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between associated objects.

Referring to "one embodiment", "some embodiments", or the like that is described in this specification means that specific characteristics, structures, or features described with reference to one or more embodiments are included in the one or more embodiments of this disclosure. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise emphasized in another manner. The terms "include", "contain", "have", and their variants all mean "include but are not limited to", unless otherwise emphasized in another manner.

The following describes technical solutions of this disclosure with reference to the accompanying drawings.

Existing image-music matching methods mainly include two methods. One method is that conventional low-level features of two modals of music and an image is extracted, and a connection between the music and the image is established by using a relationship model. A matching degree between the music recommended by using this method and the image is not high. The other method is that matched pair data of music and an image is first collected, and a matching model of the music and the image is automatically learned based on a deep neural network. Suitable music can be recommended in a simple scenario by using this method.

However, in an actual scenario, an environment may include many scenes and different styles and elements. In the foregoing existing methods, an interest of a user in a current environment is not considered, and a music matching degree is reduced. For example, when a user pays attention to a cloud in a scenario and an animal in the scenario, matched music should be different.

Therefore, embodiments of this disclosure provide a music recommendation method, to obtain an attention area of a user in a complex environment by obtaining viewpoint information of the user, thereby learning of a real interest of the user in a current environment, and improving a music matching degree.

FIG. 1 shows a system architecture applied to a music recommendation method according to an embodiment of this disclosure. As shown in FIG. 1, the system architecture includes a first wearable device, a second wearable device, and a mobile terminal device. The first wearable device is a wearable device that can collect visual data of a user and record head movement data of the user, for example, smart glasses. An advanced photo system (APS) camera, a dynamic vision sensor (DVS) camera, an eye tracker, and an inertial measurement unit (IMU) sensor are mounted on the first wearable device. The second wearable device is a wearable device that can play music, for example, a headset. The mobile terminal device may be a device, for example, a mobile phone, a tablet computer, a wearable device (for example, a smartwatch), a vehicle-mounted device, an augmented reality (AR) device, a virtual reality (VR) device, a notebook computer, an ultra-mobile personal computer (UMPC), a netbook, or a personal digital assistant (PDA). The terminal device in this embodiment of this disclosure may include a touchscreen, configured to display service content to the user. A type of the terminal device is not limited in this embodiment of this disclosure.

It should be understood that the foregoing is merely examples of the devices in FIG. 1 in this embodiment of this disclosure, and is not intended to limit this embodiment of this disclosure. In addition to the foregoing examples of the devices, the devices in FIG. 1 in this embodiment of this disclosure may alternatively be other devices that can implement same functions.

When the music recommendation method in this embodiment of this disclosure is applied, the mobile terminal device sends a data collection instruction to the first wearable device. After receiving the instruction, the first wearable device collects full-frame data at a specific frequency and records picture change data, records viewpoint data, local picture data, and acceleration and angle data of head rotation of the user, and continuously sends collected data to the mobile terminal device. After receiving the data, the mobile terminal device determines an attention area and an attention mode of the user, extracts a corresponding feature based on the attention mode and the attention area of the user, and performs music matching. The mobile terminal device sends audio data to the second wearable device, and the second wearable device plays music.

Figure 2:
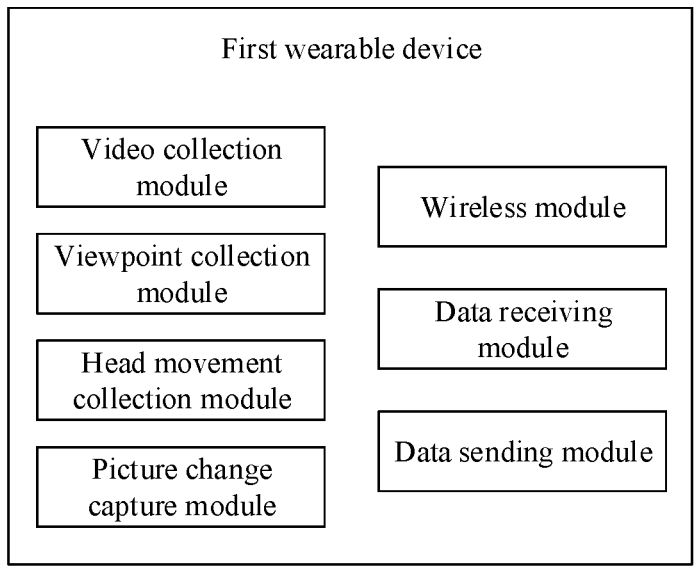
FIG. 2 is a block diagram of a first wearable device in a system architecture applied to a music recommendation method according to an embodiment of this disclosure.

FIG. 2 shows modules included in the first wearable device when the music recommendation method in this embodiment of this disclosure is applied. The modules include:

a wireless module, configured to establish a wireless link to communicate with another node, where wireless communication may use a communication manner of, for example, Wi-Fi, Bluetooth, or a cellular network;

a video frame collection module, configured to drive the APS camera on the first wearable device to collect a video frame describing an environment;

a viewpoint collection module, configured to drive the eye tracker on the glasses to collect the viewpoint data, where the viewpoint data includes a viewpoint position, an obtaining time, a staring time, and a pupil diameter;

a head movement collection module, configured to drive the IMU sensor on the glasses to collect a speed and an acceleration of the head rotation;

a picture change capture module, configured to drive the DVS camera on the glasses to collect the picture change data;

a data receiving module, configured to receive data sent by the mobile terminal device; and a data sending module, configured to send the collected data to the mobile terminal device.

Figure 3:
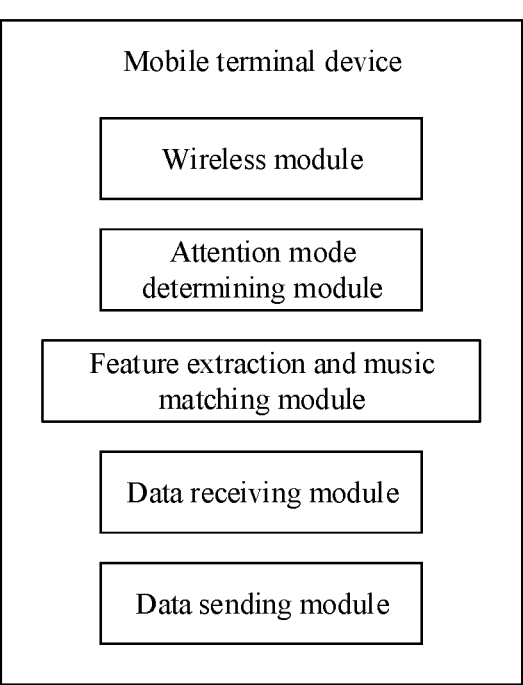
FIG. 3 is a block diagram of a terminal device in a system architecture applied to a music recommendation method according to an embodiment of this disclosure.

FIG. 3 shows modules included in the mobile terminal device when the music recommendation method in this embodiment of this disclosure is applied. The modules include:

a wireless module, configured to establish a wireless link to communicate with another node, where wireless communication may use a communication manner of, for example, Wi-Fi, Bluetooth, or a cellular network;

an attention mode determining module, configured to calculate the attention area and the attention mode based on the data collected by the glasses;

a feature extraction and music matching module, configured to perform feature extraction and music matching based on a category of the attention mode;

a data receiving module, configured to receive the data sent by the first wearable device; and a data sending module, configured to send the audio data of music and a playback instruction to the second wearable device.

FIG. 4 shows modules included in the second wearable device when the music recommendation method in this embodiment of this disclosure is applied. The modules include:

a wireless module, configured to establish a wireless link to communicate with another node, where wireless communication may use a communication manner of, for example, Wi-Fi, Bluetooth, or a cellular network;

a data receiving module, configured to receive the audio data and the playback instruction that are sent by the mobile terminal device; and an audio playback module, configured to play the music based on the audio data and the playback instruction that are sent by the mobile terminal device.

FIG. 5 is a schematic flowchart of a music recommendation method according to an embodiment of this disclosure, including an operation 501 to an operation 504. The following separately describes these operations in detail. The music recommendation method in FIG. 5 may be performed by the terminal device in FIG. 1.

S501: Receive Visual Data of a User.

The terminal device may receive the visual data that is of the user and that is sent by the first wearable device. The first wearable device collects the visual data of the user within a preset time period (for example, one second), where the visual data of the user includes viewpoint information of the user and picture information viewed by the user, and the viewpoint information includes position coordinates (x, y) of a viewpoint and attention duration of the viewpoint; and the picture information includes a video image frame collected by the APS camera and picture change data collected by the DVS camera.

S502: Obtain at Least One Attention Unit and Attention Duration of the at Least One Attention Unit Based on the Visual Data.

The at least one attention unit is obtained based on the picture information. For example, a macro block in the video image frame is used as an attention unit, where the macro block may be overlapped or not overlapped; one or more rectangular object frames are extracted as one or more attention units based on an algorithm (for example, an objectness algorithm) in which whether one object exists in one area is determined through quantization; or rectangular movement frames at different moments may be obtained based on the picture change data, and the rectangular movement frames are used as attention units. Each attention unit may use image data at a same position as the attention unit in an image frame at a latest moment as content of the attention unit.

When a picture viewed by the user is still or in an image frame, the DVS camera does not collect the picture change data in this case, and the attention duration of the attention unit may be obtained by voting on the attention unit based on all viewpoints. For example, when one viewpoint is located in one attention unit, attention duration of the viewpoint is accumulated to attention duration of the attention unit.

In an embodiment the obtaining at least one attention unit and attention duration of the at least one attention unit based on the visual data further includes: when the picture viewed by the user changes, and the DVS camera collects the picture change data in this case, still voting on an attention unit in one image frame based on the foregoing method in the image frame, to obtain attention duration of an attention unit in each image frame. For attention units in images at any two adjacent moments, one attention unit in the image at a later moment is used as an example, and is named as a second attention unit. N attention units whose distances from the second attention unit are less than a preset value are found in the image at a previous moment, where a distance between attention units is a Euclidean distance between central coordinates of two attention units, and N may be an artificially specified value or a maximum value of a quantity of attention units that meet a condition. One of the N attention units is used as an example, and is named as a first attention unit. Similarity between the first attention unit and the second attention unit is determined. That is, a feature of the first attention unit and a feature of the second attention unit are matched, where a feature matching method for the first attention unit and the second attention unit may be any existing image feature matching method. This is not limited in this embodiment of this disclosure. If it is determined that the feature of the first attention unit and the feature of the second attention unit are similar, that is, the similarity between the first attention unit and the second attention unit is greater than or equal to a first threshold, it is considered that the first attention unit and the second attention unit are presentations of a same object at different moments. In this case, attention duration of the second attention unit is equal to a sum of attention duration of the first attention unit and the attention duration of the second attention unit, and the attention duration of the first attention unit is zero. If it is determined that the feature of the first attention unit and the feature of the second attention unit are not similar, that is, the similarity between the first attention unit and the second attention unit is less than a first threshold, attention duration of the first attention unit and attention duration of the second attention unit are reserved. Attention units in images at any two adjacent moments are determined according to the foregoing method.

In an embodiment the obtaining at least one attention unit and attention duration of the at least one attention unit based on the visual data further includes: establishing a historical library of attention units, where a size of the historical library is fixed, for example, only 10 attention units can be stored. Similarity between a newly obtained attention unit and an attention unit in the historical library is determined. For example, similarity between a newly obtained second attention unit and a first attention unit in the historical library is determined, a visual feature of the first attention unit and a visual feature of the second attention unit may be separately extracted, and then similarity between the visual features is calculated. If it is determined that the feature of the first attention unit and the feature of the second attention unit are similar, that is, the similarity between the first attention unit and the second attention unit is greater than or equal to a third threshold, attention duration of the second attention unit is equal to a sum of attention duration of the first attention unit and the attention duration of the second attention unit, and the second attention unit replaces the first attention unit and is stored in the historical library. If it is determined that the feature of the first unit and the feature of the second unit are not similar, that is, the similarity between the first attention unit and the second attention unit is less than a third threshold, the first attention unit is reserved in the historical library. In this way, the attention units in the historical library and an attention duration of each attention unit may be obtained within a preset time period, for example, one second, and an attention mode of the user within the second is determined according to the method in S503. Then, an attention unit whose existence time exceeds one second and whose attention duration is less than 600 milliseconds is deleted from the historical library, and a newly obtained attention unit is supplemented.

S503: Determine an Attention Mode of the User Based on the Attention Duration of the at Least One Attention Unit.

Within a preset time period, if a standard deviation of attention duration of all attention units is greater than or equal to a second threshold, the attention mode of the user is determined as staring; or if a standard deviation of attention duration of all attention units is less than a second threshold, the attention mode of the user is determined as scanning.

S504: Determine Recommended Music Information Based on the Attention Mode.

If the attention mode of the user is scanning, the image frame collected by the APS camera is directly used as attention content of the user. If the attention mode of the user is staring, an attention unit with highest attention in all attention units within a preset time period is used as attention content of the user. Attention may be determined based on attention duration. For example, an attention unit with longest attention duration is used as the attention unit with the highest attention. Alternatively, attention may be determined based on a pupil dilation degree of the user, for example, an attention unit with a largest pupil dilation degree of the user is used as the attention unit with the highest attention. Alternatively, attention may be determined based on a quantity of review times of the user, for example, after the user stares at one attention unit and reviews the attention unit for a plurality of times, if the quantity of review times is greater than a preset value, the attention unit is used as the attention unit with the highest attention. Alternatively, attention of an attention unit is estimated by considering the foregoing three factors, for example, the attention is a product of a pupil dilation degree of the user×attention duration×a quantity of review times.

Then, the music information is determined based on the attention content. The music information may be determined based on the attention content according to an existing image-based music matching method. For example, the attention content (the image frame or the attention unit with the highest attention) is used as an input of a neural network model, and a music category with a largest probability value in an output of the neural network model is used as a determining result, for example, when the probability value is greater than 0.8, it is considered that a matching degree between an image and music is high enough.

In an embodiment after the attention content is determined based on the attention mode of the user within the preset time period, the music information may not be determined first, but a behavior state of the user within the preset time period is determined. A method for determining the behavior state based on the attention content may use an existing machine learning classification method. For example, the attention content is used as an input of a neural network model, and then a behavior state category with a largest probability value in an output of the neural network model is used as a determining result. Behavior states include driving, learning, traveling, exercising, and the like. In this way, behavior states of the user at a plurality of preset time periods within a first time period may be determined. For example, the first time period is 10 seconds, a preset time period is one second, and 10 behavior states of the user within the 10 seconds may be determined. Voting is performed on the 10 behavior states. For example, seven of the 10 behavior states are determined as learning, two of the 10 behavior states are determined as exercising, and one of the 10 behavior states is determined as traveling. Then, it is considered that a behavior state of the user within the 10 seconds is learning. Finally, music matching is performed based on the behavior state of the user within the first time period. A behavior state-based music matching method may be an existing method. For example, music matching may be performed based on label information of the behavior state. This is not limited in this embodiment of this disclosure.

After determining the music information, the terminal device may send a music playback instruction to the second wearable device based on the music information, and the second wearable device plays specified music. Alternatively, the terminal device may play music based on the music information.

In the music recommendation method in this embodiment of this disclosure, the attention mode of the user is determined based on visual information of the user, to more precisely determine the attention content of the user, so that more suitable music is recommended, and the recommended music is in line with a thing that the user is really interested in and is in line with a real behavior state of the user, thereby improving user experience.

The following describes in detail the music recommendation method in this embodiment of this disclosure with specific examples. For example, the first wearable device is smart glasses, the second wearable device is a headset, and the mobile terminal device is a mobile phone.

Figures 6, 7:
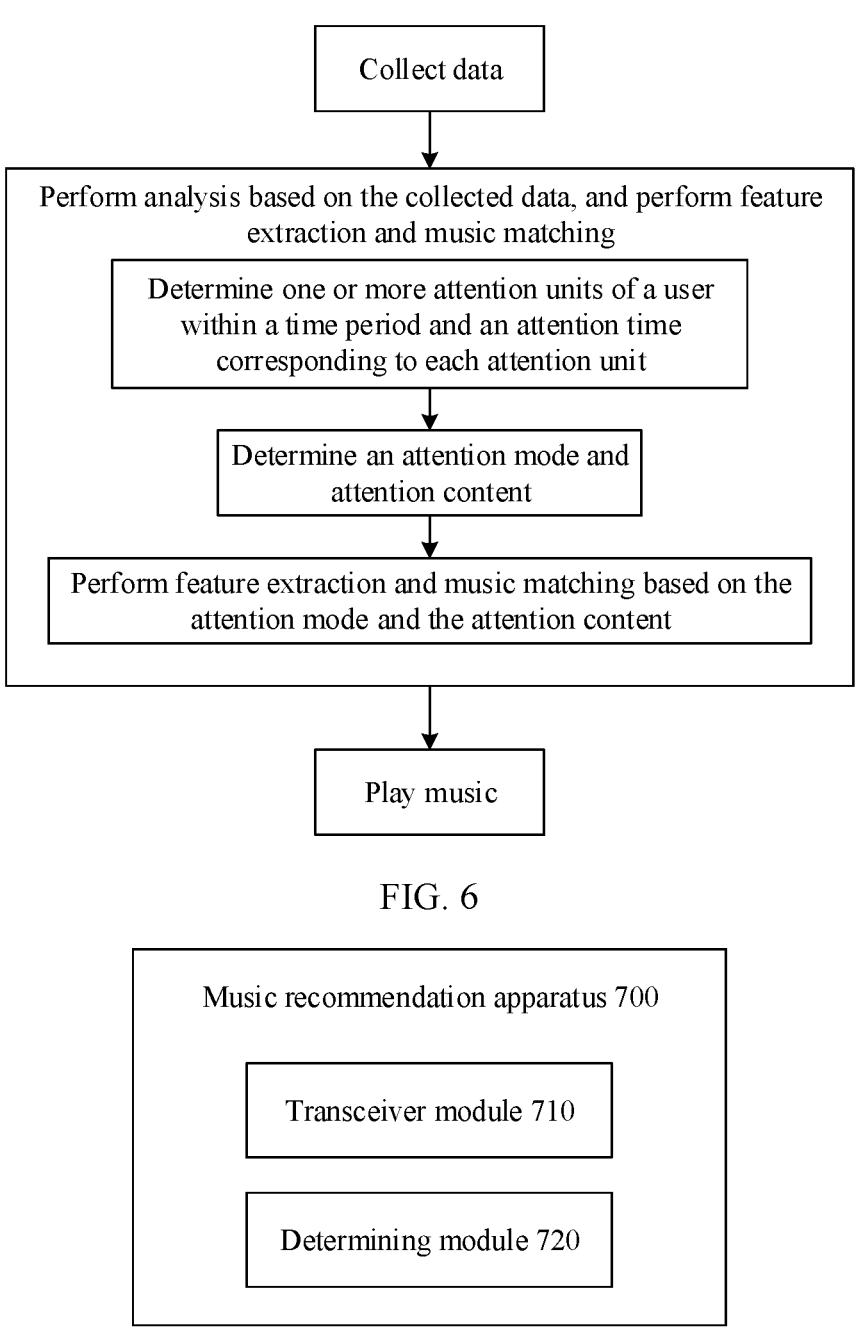
FIG. 6 is a block diagram of a music recommendation method according to an embodiment of this disclosure.
FIG. 7 is a block diagram of a music recommendation apparatus according to an embodiment of this disclosure.

FIG. 6 is a schematic block diagram of a music recommendation method according to an embodiment of this disclosure. As shown in FIG. 6, the method includes the following operations.

1: Collect data.

A mobile phone sends a data collection instruction to smart glasses. After receiving the data collection instruction sent by the mobile phone, the smart glasses start to collect the data, and continuously transmit the collected data to the mobile phone end. The collected data includes:

(1) Frame data: Frame data of an entire image that can be seen by a user by using the smart glasses is collected at a specific frequency (for example, 30 Hz).

(2) Viewpoint data: Position coordinates (x, y) of a viewpoint, a pupil diameter, an obtaining time, and a staring time of the user are recorded.

(3) Head movement data: an angle and an acceleration of head rotation.

(4) Picture change data: a quantity of events collected by a DVS camera.

2: Perform analysis based on the collected data, and perform feature extraction and music matching.

I: Determine one or more attention units of the user within a time period and an attention duration corresponding to each attention unit.

The time period may be one second. An APS frame is shot once at a start moment of the second, a picture change and eye movement data are recorded, the data is analyzed at an end of the time period, and feature extraction and music matching are performed. If a situation changes within the second, for example, a head of the user rotates a lot at a moment of 500 milliseconds, only data of the 500 milliseconds may alternatively be analyzed. However, if the time period is less than 100 milliseconds, which is insufficient for generating one fixation point, data is discarded.

The attention unit may be a macro block, a rectangular object frame, or a rectangular movement frame. When the attention unit is a macro block, the macro block may be overlapped or not overlapped. When the attention unit is a rectangular object frame, one or more rectangular object frames may be extracted as one or more attention units based on an algorithm (for example, an objectness algorithm) in which whether one object exists in one area is determined through quantization. When the attention unit is a rectangular movement frame, a rectangular movement frame at each moment may be obtained based on event data collected by the DVS camera. The event data collected by the DVS camera is first represented as frame data at each moment. That is, a grayscale value of a pixel position of an event is 255, and a grayscale value of another pixel position is 0. Then, the frame data is corroded first and then expanded to obtain a movement area. Finally, a minimum rectangle frame that can cover an entire connected movement area is used as the attention unit.

When the head of the user does not move (a rotation angle of the head is less than or equal to 5 degrees) and the DVS camera does not have a local output within the second, that is, when a picture seen by the user is still, the following operations are performed:

(1) When one fixation point is located in one attention unit, attention duration of the fixation point is accumulated to attention duration of the current attention unit.

(2) An attention unit whose attention duration is 0 is removed, and attention units with highly coincident areas are removed according to a non maximum suppression (non maximum suppression, NMS) method.

When the head of the user does not move (the rotation angle of the head is less than or equal to 5 degrees) and the DVS camera has a local output within the second, that is, when the picture seen by the user changes, a visual tracking behavior may occur, and the following operations are performed:

(1) At a same moment, when one fixation point is located in one attention unit, attention duration of the fixation point is accumulated to attention duration of the current attention unit.

(2) An attention unit whose attention duration is 0 at each moment is removed, and attention units with highly coincident areas are removed according to an NMS method.

(3) At two adjacent moments, for one attention unit A at a later moment, N attention units closest to the attention unit are found at a previous moment, where N is a positive integer greater than or equal to 1, and a distance between two attention units is a Euclidean distance between central coordinates of the two attention units. Feature matching is separately performed on each attention unit in the N attention units and the attention unit A. If a feature of an attention unit B at the previous moment and a feature of the attention unit A are similar, it is considered that the two attention units are presentations of a same object at different moments. Then, the attention unit B at the previous moment is deleted, and an attention duration of the attention unit B at the previous moment is accumulated to that of the attention unit A. If a feature of an attention unit B at the previous moment and a feature of the attention unit A are not similar, the two attention units are reserved.

The music recommendation method in this embodiment of this disclosure is applicable to a case in which the head of the user does not move. If the head of the user moves, music matching is not performed in this case, and the music recommendation method in this embodiment of this disclosure is performed when the head of the user does not move.

II: Determine an attention mode and attention content. The attention mode is determined as follows:

According to the foregoing determining method, (1) if a quantity of attention units is zero, it is determined that the attention mode is "scanning"; or (2) if a quantity of attention units is not zero, and a mean square error of attention durations of different attention units is greater than a preset value, for example, 100 ms, it is determined that the attention mode is "staring", otherwise, the attention mode is "scanning".

The attention content is determined as follows:

(1) When the attention mode is "scanning", it is considered that the user mainly perceives an environment in this case, and an APS image frame is used as the attention content.

(2) When the attention mode is "staring", it is considered that the user perceives an object of interest in this case, and an attention unit with highest attention is used as the attention content.

III: Perform feature extraction and music matching based on the attention mode and the attention content.

This embodiment of this disclosure provides two policies for performing feature extraction and music matching based on the attention mode and the attention content.

(1) Short term policy

A visual feature of attention content and an audio feature of music at a current time period are directly matched. For example, according to a classified machine learning method, the attention content is used as an input of a deep convolutional neural network, and a category with a largest probability value in an output of the neural network is used as a determining result. For example, when the probability value is greater than 0.8, it is determined that a matching degree between the visual feature and the audio feature of music is high, and the music is in line with current perception of the user. The image-based music matching process may be any existing image-music matching method. This is not limited in this embodiment of this disclosure.

(2) Long term policy

A state category to which content of an attention area of the user at each moment belongs is determined, and state category information at different moments is associated, to obtain a state of the user within a time period, and perform music matching based on label information of the state. The state category may be a high-frequency scenario of listening to music, for example, "driving", "learning", "traveling", or "exercising". In the process of determining the state category of the user based on the content of the attention area of the user at a specific moment, a classified machine learning method may be used. For example, the attention content is used as an input of a deep convolutional neural network, and a category with a largest probability value in an output of the network is used as a determining result. A voting method that is not related to a time or a time-weighted method that is related to a time may be used to associate the state category information at different moments. For example, a time period is divided into ten moments, where the user is determined to be learning at eight moments and is determined to be exercising at two moments. It can be learned that the state of the user within this time period is learning.

3: A headset end plays music.

After receiving audio data and a playback instruction that are sent by the mobile phone end, the headset end plays corresponding music.

In an embodiment in the music recommendation method shown in FIG. 6, this embodiment of this disclosure further provides another method for performing analysis based on the collected data, and performing feature extraction and music matching. The following describes the another method.

I: Determine one or more attention units of the user within a time period and attention duration corresponding to each attention unit.

A historical library of attention units is established, where a size of the historical library is fixed, for example, the historical library is set to store 10 attention units. The historical library is empty when just being established. Attention units generated by the user are placed into the historical library until the historical library is full, where the attention duration of the attention unit may be determined based on viewpoint voting in the foregoing method. After the historical library is full, each newly generated attention unit is matched with each attention unit in the historical library. Attention duration of the newly generated attention unit may also be determined based on viewpoint voting in the foregoing method. If similarity between an attention unit A in the historical library and a newly generated attention unit B is the highest, an attention duration corresponding to the attention unit A is accumulated to an attention duration corresponding to the attention unit B, then the attention unit A is deleted, and the attention unit B is placed in the historical library. A process of matching similarity between different attention units is that visual features of different units are separately extracted, and similarity between the features of the different units are calculated based on a speeded-up robust feature (SURF) algorithm. If an attention unit whose existence time exceeds one second and whose attention duration is less than 600 milliseconds exists in the historical library, the attention unit is deleted, and a newly generated attention unit is randomly filled.

II: Determine an attention mode and attention content based on the attention units in the historical library and attention durations.

An attention distribution balance degree of different attention units is quantized at an interval of one second based on the attention units in the historical library and the attention durations.

When a rotation angle of a head of the user is greater than 90 degrees and less than 270 degrees, that is, an angle of view of the user greatly changes, the historical library of the attention units is cleared. After the head of the user does not move, the historical library is filled again, and a balance degree of attention units is quantized again one second later.

The attention mode is determined as follows:

According to the foregoing determining method, (1) if a quantity of attention units in the historical library is zero, it is determined that the attention mode is "scanning"; or (2) if a quantity of attention units in the historical library is not zero, and a mean square error of attention durations of different attention units is greater than a preset value, for example, 100 ms, it is determined that the attention mode is "staring", otherwise, the attention mode is "scanning".

The attention content is determined as follows:

(1) When the attention mode is "scanning", it is considered that the user mainly perceives an environment in this case, and an APS image frame is used as the attention content.

(2) When the attention mode is "staring", it is considered that the user perceives an object of interest in this case, and an attention unit with highest attention is used as the attention content.

III: Perform feature extraction and music matching based on the attention mode and the attention content.

This embodiment of this disclosure provides two policies for performing feature extraction and music matching based on the attention mode and the attention content.

(1) Short term policy

A visual feature of attention content and an audio feature of music at a current time period are directly matched. For example, according to a classified machine learning method, the attention content is used as an input of a deep convolutional neural network, and a category with a largest probability value in an output of the neural network is used as a determining result. For example, when the probability value is greater than 0.8, it is determined that a matching degree between the visual feature and the audio feature of music is high, and the music is in line with current perception of the user. The image-based music matching process may be any existing image-music matching method. This is not limited in this embodiment of this disclosure.

(2) Long term policy

A state category to which content of an attention area of the user at each moment belongs is determined, and state category information at different moments is associated, to obtain a state of the user within a time period, and perform music matching based on label information of the state. The state category may be a high-frequency scenario of listening to music, for example, "driving", "learning", "traveling", or "exercising". In the process of determining the state category of the user based on the content of the attention area of the user at a specific moment, a classified machine learning method may be used. For example, the attention content is used as an input of a deep convolutional neural network, and a category with a largest probability value in an output of the network is used as a determining result. A voting method that is not related to a time or a time-weighted method that is related to a time may be used to associate the state category information at different moments. For example, a time period is divided into ten moments, where the user is determined to be learning at eight moments and is determined to be exercising at two moments. It can be learned that the state of the user within this time period is learning.

The data collection method and the method for music playback at the headset end are the same as the data collection method and the method for music playback at the headset end in the previous music recommendation method. Details are not described in this embodiment of this disclosure again for brevity.

In the music recommendation method in this embodiment of this disclosure, different music is recommended based on different attention content of the user, to provide better music experience. In the music recommendation method in this embodiment of this disclosure, the viewpoint data, the head movement data, and environment data of the user are obtained, to determine a current attention mode of the user, and a full-frame image or a local attention area is selected, based on a determining result, as a basis for music matching.

The foregoing describes the music recommendation method in embodiments of this disclosure, and the following describes a music recommendation apparatus in embodiments of this disclosure.

FIG. 7 is a schematic block diagram of a music recommendation apparatus according to an embodiment of this disclosure. As shown in FIG. 7, the music recommendation apparatus includes a transceiver module 710 and a determining module 720. The following separately describes functions of the transceiver module 710 and the determining module 720.

The transceiver module 710 is configured to receive visual data of a user.

The determining module 720 is configured to obtain at least one attention unit and attention duration of the at least one attention unit based on the visual data.

The determining module 720 is further configured to determine an attention mode of the user based on the attention duration of the at least one attention unit.

The determining module 720 is further configured to determine recommended music information based on the attention mode.

In an embodiment the visual data includes viewpoint information of the user and picture information viewed by the user, and the viewpoint information includes a position of a viewpoint and attention duration of the viewpoint.

In an embodiment the determining module 720 is further configured to obtain the at least one attention unit based on the picture information; and obtaining a sum of the attention duration of the viewpoint in the at least one attention unit, to use the sum as the attention duration of the at least one attention unit.

In an embodiment the determining module 720 is further configured to determine similarity between a first attention unit and a second attention unit in the at least one attention unit, where the first attention unit and the second attention unit are attention units at different moments; and if the similarity is greater than or equal to a first threshold, attention duration of the second attention unit is equal to a sum of attention duration of the first attention unit and the attention duration of the second attention unit.

In an embodiment the determining module 720 is further configured to, if a standard deviation of the attention duration of the at least one attention unit is greater than or equal to a second threshold, determine that the attention mode of the user is staring; or if a standard deviation of the attention duration of the at least one attention unit is less than a second threshold, determine that the attention mode of the user is scanning.

In an embodiment the determining module 720 is configured to determine music information based on the attention mode includes: if the attention mode is scanning, determining the music information based on the picture information; or if the attention mode is staring, determining the music information based on an attention unit with highest attention in the attention units.

That the determining module 720 determines music information based on the attention mode further includes: determining a behavior state of the user at each moment within a first time period based on the attention mode; determining a behavior state of the user within the first time period based on the state at each moment; and determining the music information based on the behavior state within the first time period.

It should be understood that, in the music recommendation apparatus 700 in this embodiment of this disclosure, the transceiver module 710 may be configured to perform the method of S501 in FIG. 5, and the determining module 720 may be configured to perform the method of S502 to S504 in FIG. 5. For specific description, refer to the foregoing description of FIG. 5. Details are not described herein again in this embodiment of this disclosure for brevity.

Figure 8:
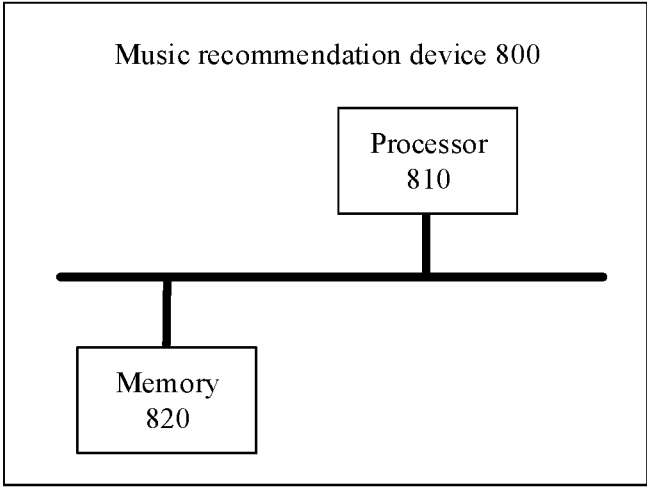
FIG. 8 is a block diagram of a music recommendation device according to an embodiment of this disclosure.

FIG. 8 is a schematic block diagram of a music recommendation device 800 according to an embodiment of this disclosure. The music recommendation device 800 may be configured to perform the music recommendation method provided in the foregoing embodiments. Details are not described herein again for brevity. The music recommendation device 800 includes a processor 810, where the processor 810 is coupled to a memory 820, the memory 820 is configured to store a computer program or instructions, and the processor 810 is configured to execute the computer program or the instructions stored in the memory 820, so that the method in the foregoing method embodiments is performed.

An embodiment of this disclosure further provides a computer-readable storage medium. The computer-readable storage medium stores program instructions, and when the program instructions are run by a processor, the music recommendation method in embodiments of this disclosure is implemented.

An embodiment of this disclosure further provides a computer program product. The computer program product includes computer program code, and when the computer program code is run on a computer, the music recommendation method in embodiments of this disclosure is implemented.

An embodiment of this disclosure further provides a music recommendation system. The system includes a data collection device and a terminal device, where the terminal device includes a processor and a memory, the memory stores one or more programs, and the one or more computer programs include instructions; the data collection device is configured to collect visual data of a user; and when the instructions are executed by the one or more processors, the terminal device is enabled to perform the music recommendation method in embodiments of this disclosure.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this disclosure, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely example implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A music recommendation method comprising:
receiving visual data of a user, wherein the visual data comprises picture information viewed by the user;
obtaining at least one attention unit and attention duration of the at least one attention unit based on the visual data, wherein obtaining the at least one attention unit and the attention duration of the at least one attention unit comprises: obtaining the at least one attention unit based on the picture information, determining a similarity between a first attention unit of the at least one attention unit and a second attention unit of the at least one attention unit, and when the similarity is greater than or equal to a first threshold, determining that attention duration of the second attention unit is equal to a sum of attention duration of the first attention unit and the attention duration of the second attention unit, wherein the first attention unit and the second attention unit are attention units at different moments in time, and the attention duration of the at least one attention unit comprises the attention duration of the second attention unit;

determining an attention mode of the user based on the attention duration of the at least one attention unit; and
determining recommended music information based on the attention mode.

2. The method according to claim 1, wherein the visual data further comprises viewpoint information of the user, and the viewpoint information comprises a position of a viewpoint and attention duration of the viewpoint.

3. The method according to claim 1, wherein determining the attention mode of the user comprises:
when a standard deviation of the attention duration of the at least one attention unit is greater than or equal to a second threshold, determining that the attention mode of the user is a staring mode; or
when a standard deviation of the attention duration of the at least one attention unit is less than a second threshold, determining that the attention mode of the user is a scanning mode.

4. The method according to claim 1, wherein determining the recommended music information comprises:
when the attention mode is a scanning mode, determining the music information based on the picture information; or
when the attention mode is a staring mode, determining the music information based on an attention unit with highest attention in the at least one attention unit.

5. The method according to claim 4, wherein determining the recommended music information further comprises:
determining a behavior state of the user at each moment within a first time period based on the attention mode;
determining a behavior state of the user within the first time period based on the state at each moment; and
determining the music information based on the behavior state within the first time period.

6. The method according to claim 1, wherein obtaining the at least one attention unit and the attention duration of the at least one attention unit further comprises: when the similarity is less than the first threshold, reserving the attention duration of the first attention unit and the attention duration of the second attention unit, wherein the attention duration of the at least one attention unit comprises the attention duration of the first attention unit and the attention duration of the second attention unit.

7. A music recommendation apparatus, comprising:
a memory to store executable instructions thereon, and
a processor coupled to the memory to execute the executable instructions to cause the music recommendation apparatus to perform operations comprising:
receiving visual data of a user, wherein the visual data comprises picture information viewed by the user;
obtaining at least one attention unit and attention duration of the at least one attention unit based on the visual data, wherein obtaining the at least one attention unit and the attention duration of the at least one attention unit comprises: obtaining the at least one attention unit based on the picture information, determining a similarity between a first attention unit of the at least one attention unit and a second attention unit of the at least one attention unit, and when the similarity is greater than or equal to a first threshold, determining that attention duration of the second attention unit is equal to a sum of attention duration of the first attention unit and the attention duration of the second attention unit, wherein the first attention unit and the second attention unit are attention units at different moments in time, and the attention duration of the at least one attention unit comprises the attention duration of the second attention unit;

determining an attention mode of the user based on the attention duration of the at least one attention unit; and determining recommended music information based on the attention mode.

8. The music recommendation apparatus according to claim 7, wherein the visual data further comprises viewpoint information of the user, and the viewpoint information comprises a position of a viewpoint and attention duration of the viewpoint.

9. The music recommendation apparatus according to claim 7, wherein determining the attention mode of the user comprises:

when a standard deviation of the attention duration of the at least one attention unit is greater than or equal to a second threshold, determining that the attention mode of the user is a staring mode; or when a standard deviation of the attention duration of the at least one attention unit is less than a second threshold, determining that the attention mode of the user is a scanning mode.

10. The music recommendation apparatus according to claim 7, wherein determining the recommended music information comprises:

when the attention mode is a scanning mode, determining the music information based on the picture information; or when the attention mode is a staring mode, determining the music information based on an attention unit with highest attention in the at least one attention unit.

11. The music recommendation apparatus according to claim 10, wherein determining the recommended music information further comprises:

determining a behavior state of the user at each moment within a first time period based on the attention mode;

determining a behavior state of the user within the first time period based on the state at each moment; and determining the music information based on the behavior state within the first time period.

12. The music recommendation apparatus according to claim 7, wherein obtaining the at least one attention unit and the attention duration of the at least one attention unit further comprises: when the similarity is less than the first threshold, reserving the attention duration of the first attention unit and the attention duration of the second attention unit, wherein the attention duration of the at least one attention unit comprises the attention duration of the first attention unit and the attention duration of the second attention unit.

13. A non-transitory computer-readable storage medium storing executable instructions thereon, that when executed by a processor of an apparatus, cause the apparatus to perform operations comprising:

receiving visual data of a user, wherein the visual data comprises picture information viewed by the user;

obtaining at least one attention unit and attention duration of the at least one attention unit based on the visual data, wherein obtaining the at least one attention unit and the attention duration of the at least one attention unit comprises: obtaining the at least one attention unit based on the picture information, determining a similarity between a first attention unit of the at least one attention unit and a second attention unit of the at least one attention unit, and when the similarity is greater than or equal to a first threshold, determining that attention duration of the second attention unit is equal to a sum of attention duration of the first attention unit and the attention duration of the second attention unit, wherein the first attention unit and the second attention unit are attention units at different moments in time, and the attention duration of the at least one attention unit comprises the attention duration of the second attention unit;

determining an attention mode of the user based on the attention duration of the at least one attention unit; and determining recommended music information based on the attention mode.

14. The non-transitory computer-readable storage medium according to claim 13, wherein the visual data further comprises viewpoint information of the user, and the viewpoint information comprises a position of a viewpoint and attention duration of the viewpoint.

15. The non-transitory computer-readable storage medium according to claim 13, wherein determining the attention mode of the user comprises:

when a standard deviation of the attention duration of the at least one attention unit is greater than or equal to a second threshold, determining that the attention mode of the user is a staring mode; or when a standard deviation of the attention duration of the at least one attention unit is less than a second threshold, determining that the attention mode of the user is a scanning mode.

16. The non-transitory computer-readable storage medium according to claim 13, wherein determining the recommended music information comprises:

when the attention mode is a scanning mode, determining the music information based on the picture information; or when the attention mode is a staring mode, determining the music information based on an attention unit with highest attention in the at least one attention unit.

17. The non-transitory computer-readable storage medium according to claim 13, wherein obtaining the at least one attention unit and the attention duration of the at least one attention unit further comprises: when the similarity is less than the first threshold, reserving the attention duration of the first attention unit and the attention duration of the second attention unit, wherein the attention duration of the at least one attention unit comprises the attention duration of the first attention unit and the attention duration of the second attention unit.

* * * * *